(12) United States Patent
Archetti

(10) Patent No.: US 10,247,078 B2
(45) Date of Patent: Apr. 2, 2019

(54) CATALYST THERMAL REGENERATION BY EXHAUST GAS

(71) Applicants: Haldor Topsøe A/S, Kgs. Lyngby (DK); Ecospray Technologies S.r.l., Alzano Scrivia (IT)

(72) Inventor: Maurizio Archetti, Verscio (CH)

(73) Assignees: Haldor Topsoe A/S, Kgs. Lyngby (DK); Ecospray Technologies S.r.l., Alzano Scrivia (IT)

( * ) Notice: Subject to any disclaimer, the term of this patent is extended or adjusted under 35 U.S.C. 154(b) by 130 days.

(21) Appl. No.: 15/502,727

(22) PCT Filed: Jul. 24, 2015

(86) PCT No.: PCT/EP2015/066968
§ 371 (c)(1),
(2) Date: Feb. 8, 2017

(87) PCT Pub. No.: WO2016/030094
PCT Pub. Date: Mar. 3, 2016

(65) Prior Publication Data
US 2017/0226915 A1    Aug. 10, 2017

(30) Foreign Application Priority Data

Aug. 28, 2014 (DK) ................................. 2014 00480

(51) Int. Cl.
*F01N 13/10* (2010.01)
*F01N 3/34* (2006.01)
*F01N 3/035* (2006.01)
*F01N 3/22* (2006.01)
*F01N 3/30* (2006.01)
*F01N 9/00* (2006.01)

(52) U.S. Cl.
CPC ............... *F01N 3/34* (2013.01); *F01N 3/035* (2013.01); *F01N 3/22* (2013.01); *F01N 3/306* (2013.01); *F01N 9/002* (2013.01); *F01N 2470/30* (2013.01); *F01N 2590/02* (2013.01); *Y02T 10/47* (2013.01)

(58) Field of Classification Search
CPC ..... F01N 3/34; F01N 3/22; F01N 9/00; F01N 3/035; F01N 9/002; F01N 2590/02
See application file for complete search history.

(56) References Cited

U.S. PATENT DOCUMENTS 3,237,399 A * 3/1966 Sheffer ................... F01N 3/22
                                                    137/520
8,490,387 B2   7/2013 Schreiber et al.
(Continued)

FOREIGN PATENT DOCUMENTS

CN    102439269 A    5/2012
CN    103670613 A    3/2014
(Continued)

*Primary Examiner* — Patrick D Maines
(74) *Attorney, Agent, or Firm* — Blank Rome LLP

(57) ABSTRACT

Method and system for thermal regeneration of a catalyst by inlet turbine exhaust gas from a diesel engine, where a gas split stream (08) is led from the engine exhaust (02) through an eductor (04) and further to regeneration of a catalyst, wherein a cold air stream (09) is used to keep the regeneration gas stream at a desired constant temperature range.

5 Claims, 1 Drawing Sheet

(56) References Cited

U.S. PATENT DOCUMENTS

| | | |
|---|---|---|
| 9,238,983 B2 | 1/2016 | Zhang et al. |
| 2008/0092861 A1 | 4/2008 | Duffy et al. |
| 2010/0000204 A1* | 1/2010 | Hemsley ................. F01N 3/103 60/317 |
| 2014/0060009 A1* | 3/2014 | Zhang ...................... F01N 3/18 60/274 |

FOREIGN PATENT DOCUMENTS

| | | |
|---|---|---|
| DE | 44 16 014 A1 | 11/1995 |
| GB | 1022402 A * | 3/1966 |
| GB | 2 373 197 A | 9/2002 |
| JP | 51-156309 U | 12/1976 |
| JP | 11062573 A * | 3/1999 |
| JP | 2004-68654 A | 3/2004 |

* cited by examiner

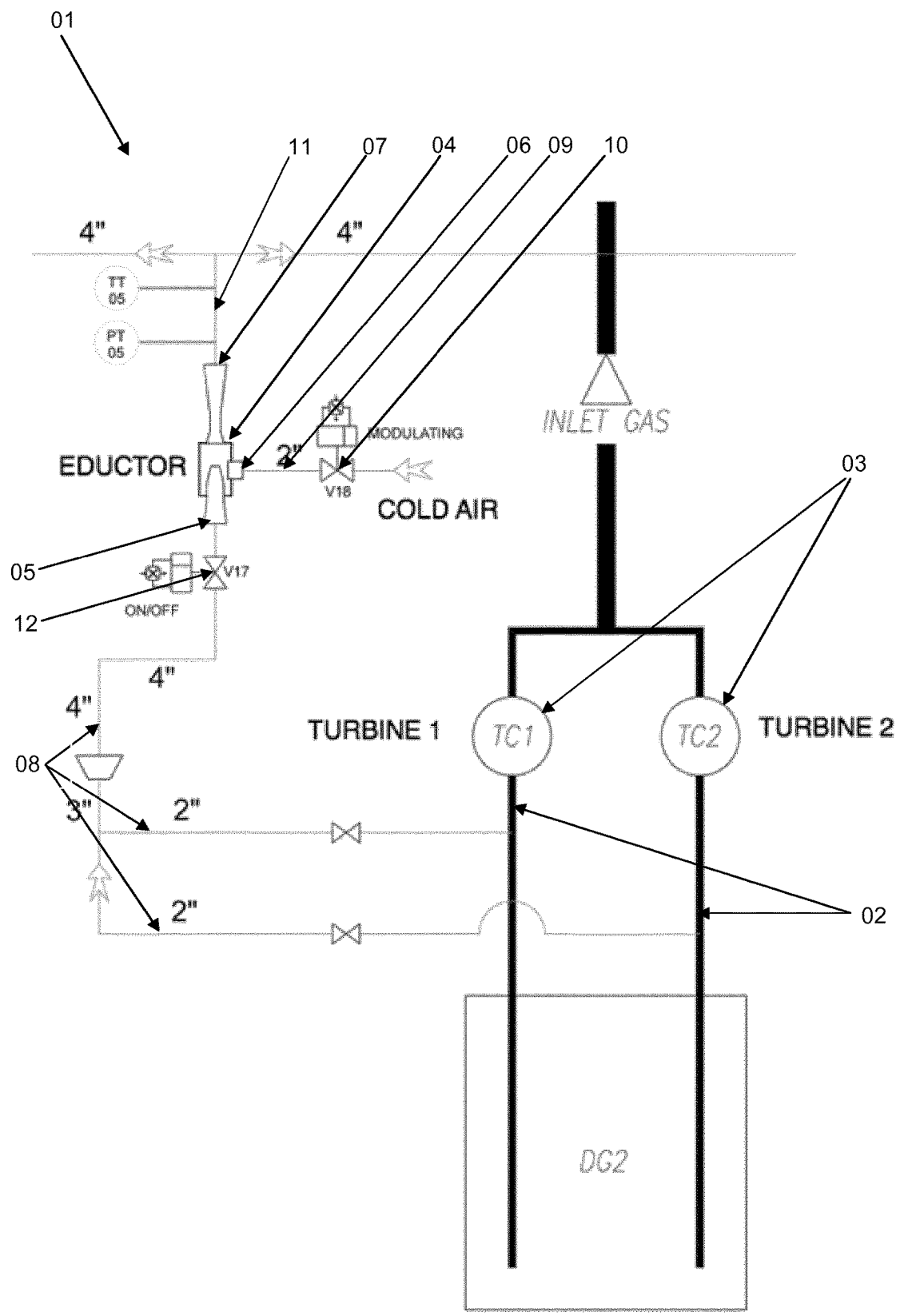

CATALYST THERMAL REGENERATION BY EXHAUST GAS

The present invention relates to a system and a method for regeneration of a catalyst by means of exhaust gas from an engine. In particular, the invention is related to regeneration of catalyst in marine engine exhaust gas cleaning applications comprising turbochargers for the removal of hydrocarbons and particulate matter in form of soot, ash and heavy metals being present in the engine exhaust gas.

Cleaning of engine exhaust gas becomes increasingly important and demanding with growing environmental regulations. Cleaning systems require extra energy and extra space which increases the overall cost of the engine systems for the ships.

Engine exhaust gas cleaning systems typically comprises catalyst which may be combined with filter systems. The exhaust gas cleaning filters are often shaped as wall flow filters, which ensure the highest cleaning efficiency, but other filter types may be employed. The filter types can be provided with oxidation catalyst.

The catalyst comprised in the exhaust gas cleaning systems needs to be regenerated. This requires a gas stream with a temperature in a range suited for regenerating the catalyst. Regeneration systems thus require additional thermal energy, which has an adverse impact on the overall efficiency of the ships propelling system and increases the equipment cost and energy consumption.

There is a need for a catalyst regeneration system and method which minimizes the expenses for providing the needed additional thermal energy. The system must regenerate the catalyst of an exhaust gas cleaning system to ensure low or no polluting discharges, especially at sea, so as to minimize the environmental footprint and impacts of navigation in ports and coastal areas, but at the same time minimize the cost of installation and operation of the regeneration system. Preferably the regeneration system must be compatible with existing engine systems, especially marine engine systems.

The present invention provides a system and a method for regeneration of catalyst, especially in marine exhaust gas cleaning systems comprising turbo charged diesel engines. The system is further compact and simple, the system and method provides catalyst regeneration at a low operation cost and also a low installation cost. Because of its compactness and simplicity, it is well suited for retrofitting to upgrade existing marine applications, but also well suited for new build applications as the compact design is space- and cost saving.

In the present system and method for catalyst regeneration, the hot gas for thermal regeneration of the catalyst is drafted directly from the engine exhaust gas header before the turbo charger turbine. This exhaust gas spilled before the turbine enters in an eductor. Thanks to the gas expansion in the eductor, a controlled stream of cold air is drafted by a regulation valve. The air valve modulates in order to maintain the right set point temperature of the exhaust gas after the eductor. The gas is then led to the catalyst which needs to be regenerated and thus additional thermal energy is not needed.

Features of the Invention:

1. System for thermal regeneration of a catalyzed soot filter in an engine exhaust gas cleaning unit comprising
one or more exhaust gas pipes connected to turbine of a turbocharger;
an eductor comprising a motive inlet, a suction inlet and an outlet;
one or more exhaust gas split stream pipes connecting the one or more exhaust gas pipes upstream the turbine of the turbocharger with the motive inlet of the eductor;
an air pipe connected to the suction inlet of the eductor; a flow regulation valve mounted in the air pipe; and
an eductor outlet pipe connecting the eductor outlet with the catalysed soot filter.

2. System for thermal regeneration of a catalyzed soot filter in an engine exhaust gas cleaning unit according to feature 1, wherein the flow regulation valve is adapted to regulate the amount of air sucked into the eductor to achieve a constant temperature range of the gas exiting the eductor.

3. System for thermal regeneration of a catalyzed soot filter in an engine exhaust gas cleaning unit according to feature 2, wherein the temperature range is 380° C.-500° C.

4. System for thermal regeneration of a catalyzed soot filter in an engine exhaust gas cleaning unit according to any of the preceding features, wherein the catalyzed soot filter is a compact combined DPF filter.

5. System for thermal regeneration of a catalyzed soot filter in an engine exhaust gas cleaning unit according to any of the preceding features, wherein the engine is marine diesel engine.

6. System for thermal regeneration of a catalyzed soot filter in an engine exhaust gas cleaning unit according to any of the preceding features, further comprising regulating valve arranged in the one or more exhaust gas split stream pipes adapted to open, shut or regulate the exhaust gas flow to the motive inlet of the eductor.

7. System for thermal regeneration of a catalyzed soot filter in an engine exhaust gas cleaning unit according to any of the preceding features, wherein the exhaust gas from the engine has a temperature of 400° C.-520° C.

8. System for thermal regeneration of a catalyzed soot filter in an engine exhaust gas cleaning unit according to any of the preceding features, wherein the exhaust gas from the engine has a pressure of 1-2.5 barg.

9. Method for controlled thermal regeneration of a catalysed soot filter in an engine exhaust gas cleaning unit with a mixture of exhaust gas and ambient air at a predetermined set point temperature, comprising the steps of
providing a pressurized exhaust gas split stream from an upstream turbocharger;
passing the pressurized split stream at exhaust gas temperature to into a motive inlet of an eductor and drawing lower pressure, ambient air at a temperature lower than the exhaust gas temperature through suction inlet of the eductor;
controlling the amount of ambient air drawn through the suction inlet of the eductor to obtain the predetermined set point temperature; and
contacting the thus obtained exhaust gas air mixture with the catalysed soot filter for a time sufficient for soot regeneration of the filter.

10. Method for controlled thermal regeneration of a catalysed soot filter in an engine exhaust gas cleaning unit with a mixture of exhaust gas and ambient air at a predetermined set point temperature according to feature 9, wherein the set point temperature is in the range of 380° C.-500° C.

11. Method for controlled thermal regeneration of a catalysed soot filter in an engine exhaust gas cleaning unit with a mixture of exhaust gas and ambient air at a predetermined set point temperature according to feature 9 or 10, wherein the catalyzed soot filter is a compact combined DPF filter.

12. Method for controlled thermal regeneration of a catalysed soot filter in an engine exhaust gas cleaning unit with a mixture of exhaust gas and ambient air at a predetermined set point temperature according to any of the features 9-11, wherein the engine is marine diesel engine.

13. Method for controlled thermal regeneration of a catalysed soot filter in an engine exhaust gas cleaning unit with a mixture of exhaust gas and ambient air at a predetermined set point temperature according to any of the features 9-12, further comprising regulating valve arranged in the one or more exhaust gas split stream pipes adapted to open, shut or regulate the exhaust gas flow to the motive inlet of the eductor.

14. Method for controlled thermal regeneration of a catalysed soot filter in an engine exhaust gas cleaning unit with a mixture of exhaust gas and ambient air at a predetermined set point temperature according to any of the features 9-13, wherein the exhaust gas from the engine has a temperature of 400° C.-520° C.

15. Method for controlled thermal regeneration of a catalysed soot filter in an engine exhaust gas cleaning unit with a mixture of exhaust gas and ambient air at a predetermined set point temperature according to any of the features 9-14, wherein the exhaust gas from the engine has a pressure of 1-2.5 barg.

POSITION NUMBERS OF THE DRAWING

01. Catalyst thermal regeneration system.
02. Exhaust gas pipe.
03. Turbo charger turbine.
04. Eductor.
05. Eductor motive inlet.
06. Eductor suction inlet.
07. Eductor outlet.
08. Exhaust gas split stream pipe.
09. Air pipe.
10. Flow regulation valve.
11. Eductor outlet pipe.
12. Exhaust gas regulation valve.

DESCRIPTION OF THE DRAWING

A more detailed description of the method and system will be apparent from the following description of a specific embodiment with reference to the drawing in which FIG. 1 shows the catalyst thermal regeneration system 01 according to an embodiment of the invention. Two exhaust gas pipes 02 connect the diesel engine exhaust gas header with the two turbo charger turbines 03. A part of the exhaust gas is spilled from the exhaust gas pipes to the eductor 04 through the exhaust gas split stream pipes 08. This exhaust gas split stream is connected to the eductor motive inlet 05 through an exhaust gas regulation valve 12, which is adapted to adjust the flow of the gas split stream according to the need of regeneration of the catalyst (not shown). The gas split stream may be a pulse stream, which is only connected to the catalyst during regeneration periods divided by operation periods without regeneration. When passing through the eductor, the exhaust gas split stream is capable of sucking in a stream of ambient (colder) air from the air pipe 09 through the eductor suction inlet 06 because of the gas expansion in the eductor.

The combined stream comprising the exhaust gas split stream and an amount of cold air exits the eductor through the eductor outlet 07 and is led to the catalyst to be regenerated by the eductor outlet pipe 11. The temperature of the combined stream is able to be kept in a desired constant range despite the variation of the exhaust gas temperature due to the presence of the flow regulation valve 10 located in the air pipe. The flow regulation valve is adapted to adjust the amount of colder ambient air relative to the exhaust gas split stream, thereby keeping the combined gas stream at a constant temperature range.

EXAMPLE

In a catalyst thermal regeneration system, the exhaust gas from a diesel engine has a pressure of 1-2.5 barg and a temperature of 400-520° C. according to the engine load.

The flow regulation valve modulates and adjusts the flow (suction) of colder ambient air in order to keep the temperature of the combined gas stream after the eductor in the range of 380-500° C. suited for regeneration of a catalyst.

The invention claimed is:

1. System for thermal regeneration of a catalyzed soot filter in an engine exhaust gas cleaning unit comprising:
    one or more exhaust gas pipes connected to a turbine of a turbocharger;
    an eductor comprising a motive inlet, a suction inlet and an outlet;
    one or more exhaust gas split stream pipes connecting the one or more exhaust gas pipes upstream of the turbine of the turbocharger with the motive inlet of the eductor;
    an air pipe connected to the suction inlet of the eductor;
    a flow regulation valve mounted in the air pipe; and
    an eductor outlet pipe connected to the educator outlet.

2. System for thermal regeneration of a catalyzed soot filter in an engine exhaust gas cleaning unit according to claim 1, wherein the engine is marine diesel engine.

3. System for thermal regeneration of a catalyzed soot filter in an engine exhaust gas cleaning unit according to claim 1, further comprising regulating valve arranged in the one or more exhaust gas split stream pipes adapted to open, shut or regulate the exhaust gas flow to the motive inlet of the eductor.

4. System for thermal regeneration of a catalyzed soot filter in an engine exhaust gas cleaning unit according to claim 1, wherein the exhaust gas from the engine has a temperature of 400° C.-520° C.

5. System for thermal regeneration of a catalyzed soot filter in an engine exhaust gas cleaning unit according to claim 1, wherein the exhaust gas from the engine has a pressure of 1-2.5 barg.

* * * * *